United States Patent
Trujillo-Lucero

(10) Patent No.: US 10,419,056 B2
(45) Date of Patent: Sep. 17, 2019

(54) PORTABLE ELECTRONIC DEVICE CARRIER FRAME WITH DUAL-SIDED ACCESSIBILITY

(71) Applicant: Jeanette Trujillo-Lucero, Morrison, CO (US)

(72) Inventor: Jeanette Trujillo-Lucero, Morrison, CO (US)

( * ) Notice: Subject to any disclaimer, the term of this patent is extended or adjusted under 35 U.S.C. 154(b) by 0 days.

(21) Appl. No.: 15/873,603

(22) Filed: Jan. 17, 2018

(65) Prior Publication Data

US 2019/0222247 A1    Jul. 18, 2019

(51) Int. Cl.
*H04B 1/3888*    (2015.01)
*A45F 5/02*    (2006.01)
(Continued)

(52) U.S. Cl.
CPC .............. *H04B 1/3888* (2013.01); *A45F 5/02* (2013.01); *H04M 1/0283* (2013.01);
(Continued)

(58) Field of Classification Search
CPC ...... A45F 5/02; A45F 2200/0516; A45F 5/00; A45F 5/10; A45F 2005/008; A45C 2011/002; A45C 11/00; A45C 13/26; A45C 13/30; H04B 1/385; H04B 1/3888; H04B 1/3877; H04M 1/0281; H04M 1/0283; H04M 1/0206; H04M 1/04; H04M 1/185; A44C 9/0061; B60R 11/00; B60R 11/0252; B65D 25/00; E05D 3/022; E05D 11/0054; F16B 11/006; F16B 11/10; F16M 11/043; F16M 11/105; F16M 11/2028;
(Continued)

(56) References Cited

U.S. PATENT DOCUMENTS 7,416,099 B2    8/2008    deLéon et al.
8,523,031 B2    9/2013    Hedrick
(Continued)

OTHER PUBLICATIONS

"Orange Smart Catch," Retrieved from the Internet: <URL: https://milogiftshop.com/products/orange-smart-catch>, archived Aug. 21, 2016 by web.archive.org, 3 pages.

*Primary Examiner* — Yuwen Pan
*Assistant Examiner* — Paul P Tran
(74) *Attorney, Agent, or Firm* — Merchant & Gould P.C.

(57) ABSTRACT

A portable electronic device carrier includes a main strap, first and second elastic framing components, and a framing cover. The main strap includes a framing portion and a non-framing portion. Both the framing portion and framing cover include first and second channels within which reside the first and second elastic framing components; the first and second elastic framing components comprise continuous loops. The framing portion and the framing cover along with the first and second elastic framing components, define a portable electronic device soft form frame having a central opening there through. When a portable electronic device is received within the portable electronic device soft form frame, a tension of the first and second elastic framing components retains the portable electronic device within the portable electronic device soft form frame and provides user access to both a front face and a rear face of the portable electronic device.

20 Claims, 4 Drawing Sheets

(51) Int. Cl.
*H04M 1/02* (2006.01)
*H04B 1/3827* (2015.01)
*A45C 11/00* (2006.01)

(52) U.S. Cl.
CPC . *A45C 2011/002* (2013.01); *A45F 2200/0516* (2013.01); *H04B 1/385* (2013.01)

(58) Field of Classification Search
CPC .. F16M 11/2057; F16M 13/02; F16M 13/022; F16M 13/04; G06F 1/1626; G06F 1/1628; G06F 1/163; G06F 1/166; H05K 5/0004; H05K 5/02; H05K 5/0204; H05K 5/0226; H05K 5/0234; H05K 5/03; H05K 7/00; H01H 9/04
USPC ...................................................... 455/575.8
See application file for complete search history.

(56) References Cited

U.S. PATENT DOCUMENTS

| | | | |
|---|---|---|---|
| 8,668,122 B2 | 3/2014 | Case et al. | |
| 9,060,588 B2 | 6/2015 | Bransfield et al. | |
| 9,314,078 B1 | 4/2016 | Haymond | |
| 9,438,299 B2 * | 9/2016 | Haymond | H04B 1/3888 |
| D782,185 S * | 3/2017 | Lederer | D14/252 |
| 2004/0069822 A1 | 4/2004 | Condiff | |
| 2005/0127123 A1 * | 6/2005 | Smithers | A45F 5/00 224/610 |
| 2006/0076381 A1 * | 4/2006 | Elizalde Rodarte | A45F 5/00 224/600 |
| 2007/0228099 A1 | 10/2007 | Beda | |
| 2009/0013719 A1 * | 1/2009 | Loving | A44C 15/003 63/1.12 |
| 2010/0302716 A1 * | 12/2010 | Gandhi | G06F 1/1624 361/679.01 |
| 2013/0146635 A1 * | 6/2013 | Hedrick | A45F 5/00 224/600 |
| 2014/0259538 A1 * | 9/2014 | Bransfield | A45F 5/02 24/3.13 |
| 2014/0326774 A1 * | 11/2014 | Coleman | H04B 1/385 224/601 |
| 2015/0265017 A1 * | 9/2015 | Mello | A45F 5/00 220/592.22 |
| 2016/0007723 A1 * | 1/2016 | Georges | A45F 5/00 224/580 |
| 2016/0105209 A1 * | 4/2016 | Dunn | H04B 1/3888 455/575.8 |

\* cited by examiner

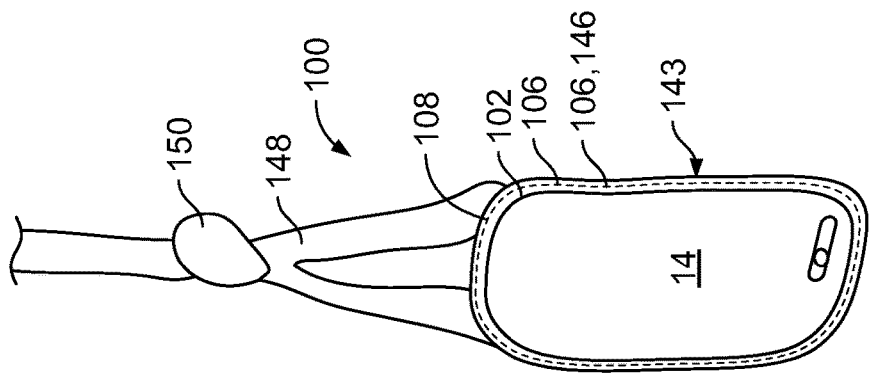
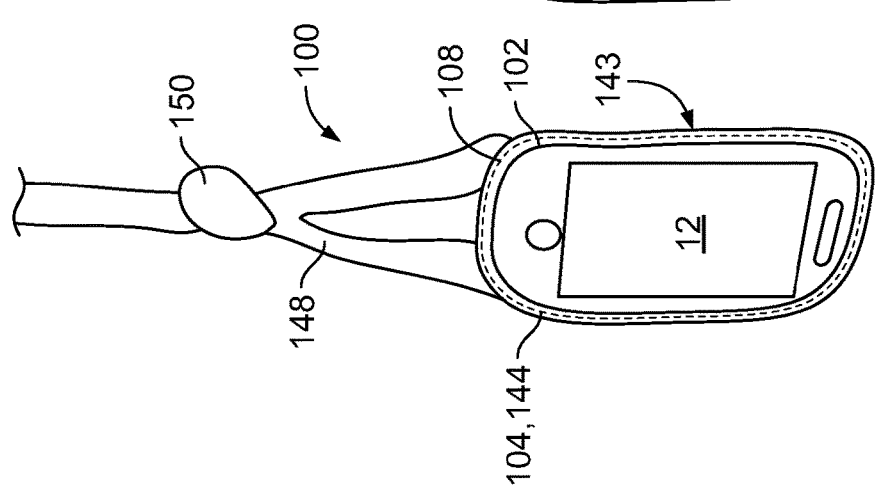
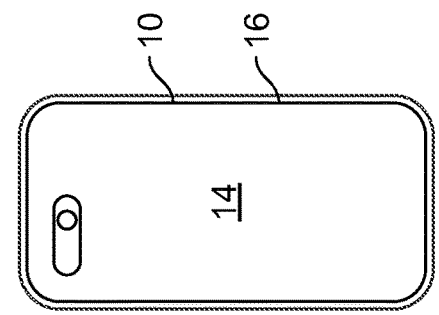
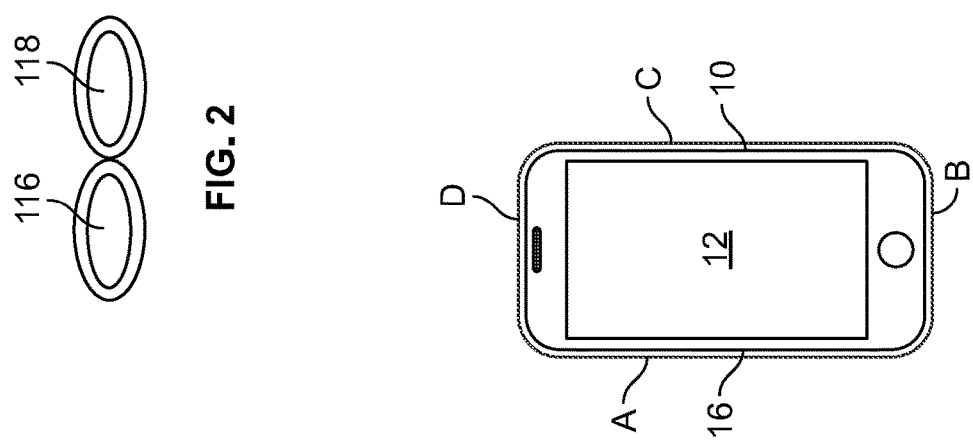

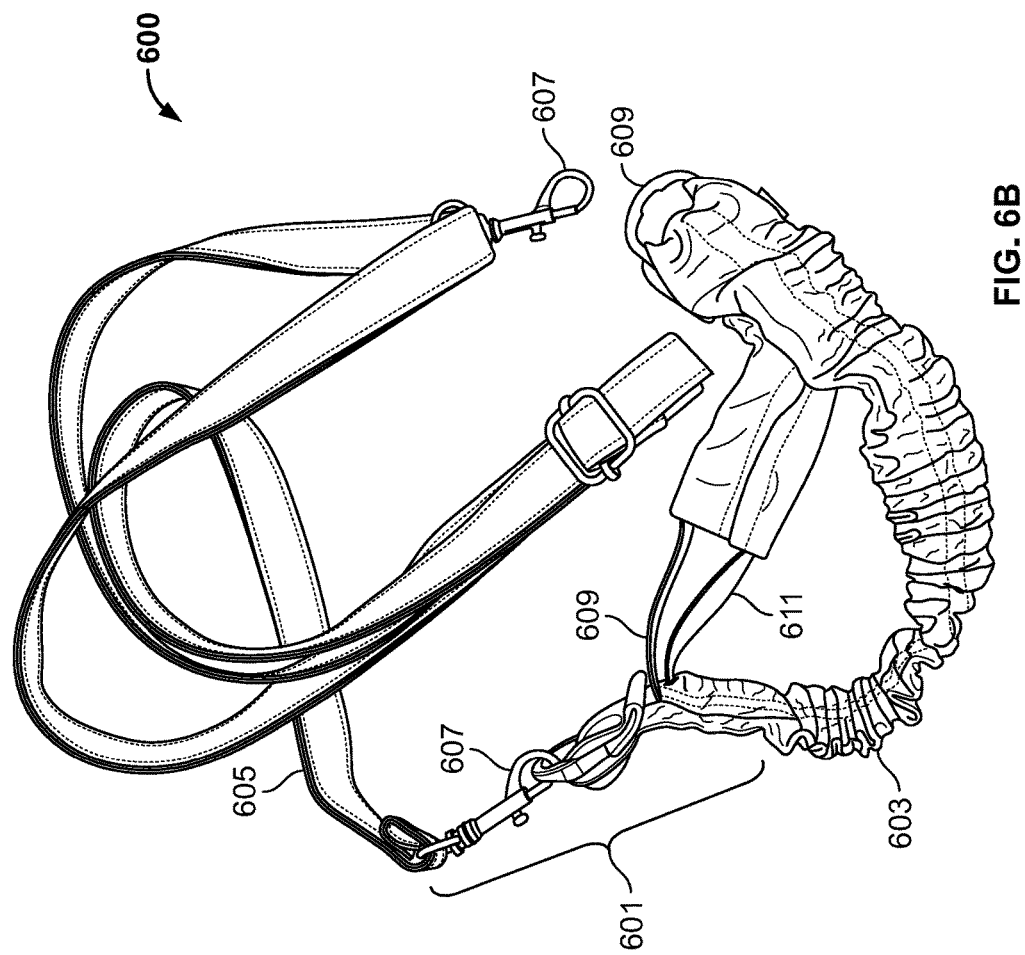
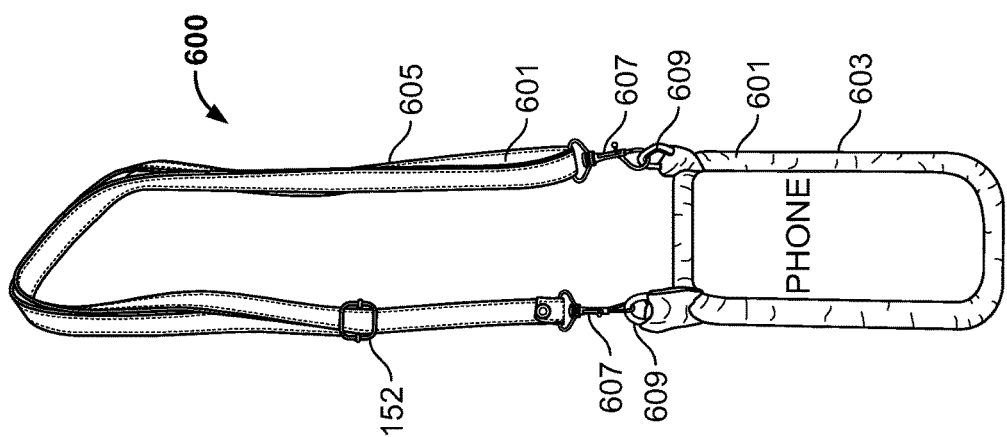
FIG. 6A
FIG. 6B

PORTABLE ELECTRONIC DEVICE CARRIER FRAME WITH DUAL-SIDED ACCESSIBILITY

FIELD OF THE DISCLOSURE

The present disclosure is directed to portable electronic device carriers, and more specifically, to portable electronic device carriers that provide a user with dual-sided accessibility.

BACKGROUND OF THE DISCLOSURE

Portable electronic devices, e.g. cell phone, tablets, etc., are now commonplace with both adults and children having their own devices. For a user to have quick access to their electronic device, the electronic device is often held in the hand, stored in a pocket, stored in a purse or bag, or laid on a surface near the user. Each of these propositions has its own drawbacks. For example, an electronic device held in the hand can be easily dropped or grabbed out of the user's hand. An electronic device stored in the pocket can be bent and suffer damage, accidentally activate an application, or be easily stolen from the user's pocket. An electronic device stored in a purse or bag can be difficult to locate, delay access to the device causing missed calls or messages, and can also suffer damage from other items within the purse or bag. An electronic device laid on a nearby surface presents an easily visible and accessible object for stealing. Further, it presents an opportunity for a user to walk away and forget their device, and provides the possibility that any calls or messages coming through and being displayed on the device are visible to non-user individuals nearby.

In certain instances, a user carries their portable electronic device in a dedicated carrier, e.g. a carrier designed to carry only the device itself. However, many dedicated carriers provide a protective covering that must be opened in order to provide access to the interactive display of the device. Even if the carrier doesn't require opening to access the electronic device, it at least provides a protective covering that adds both bulk and weight to the electronic device making the electronic device and its dedicated carrier unwieldy.

SUMMARY OF THE DISCLOSURE

The present disclosure is directed to a hands-free, portable electronic device carrier that provides a user instant accessibility (e.g. no opening of a cover required) to both the sides (e.g., the display face and rear panel opposite the display face) of the portable electronic device with minimum bulk and weight. The portable electronic device carrier of the present disclosure further provides the user with options for adjustability to suit a user's desired carrying mode, e.g. cross-body, shoulder, lanyard, wrist, backpack or attached to another item. The portable electronic device carrier of the present disclosure can additionally be attached to a wheelchair, walker or other items. Further the portable electronic device carrier enables the user to carry the electronic device in a fisted-hand position rather than an open-hand position where the span of the hand is necessary to support the electronic device.

One aspect of the disclosure is directed to a portable electronic device carrier that includes a main strap, first and second elastic framing components, and a framing portion. The main strap includes a framing portion and a non-framing portion; at least the framing portion including first and second channels. At least a portion of the first and second elastic framing components resides within the first and second channels, respectively of the framing portion. The framing cover includes first and second channels as well. The remaining portion of the first and second elastic framing components reside within the first and second channels, respectively, of the framing cover. The first and second elastic framing components each comprise a continuous loop of elastic material. The framing portion and the framing cover (which can be joined to present a continuous loop or maintained separately) along with the continuous loops of the first and second elastic framing components residing within, define a portable electronic device soft form frame having a central opening there through. When a portable electronic device is received within the portable electronic device soft form frame, a tension of the first and second elastic framing components retains the portable electronic device within the portable electronic device soft form frame.

Another aspect of the present disclosure is directed to a method for making a portable electronic device. The method includes: (a) defining a first channel and a second channel in a first soft form material, the first soft form material having a length sufficient to wrap at least three sides of a four-sided portable electronic device; (b) defining a first channel and a second channel in a second soft form material, the second soft form material having a length sufficient to wrap at least one side of a four-sided portable electronic device; (c) inserting a first elastic component, having a first and second end, through the first channel of the first soft form material and through the first channel of the second soft form material, then joining the first and second ends of the first elastic component; and (d) inserting a second elastic component, having a first and second end, through the second channel of the first soft form material and through the second channel of the second soft form material, then joining the first and second ends for the second elastic component.

BRIEF DESCRIPTION OF THE DRAWINGS

FIG. 2 is a cross-sectional view taken along line C-C of FIG. 1

FIGS. 3A-3B are front and rear views, respectively, of an exemplary portable electronic device.

FIGS. 4A-4B are front and rear perspective views, respectively, of an example embodiment an assembled portable electronic device carrier with dual-sided accessibility.

FIGS. 6A-6B illustrate an example embodiment of the portable electronic device carrier with dual-sided accessibility with a portable electronic device inserted and the portable electronic device removed, respectively.

DETAILED DESCRIPTION

The present disclosure describes a portable electronic device carrier with dual-sided accessibility; the portable electronic device can comprise for example a portable cell phone or portable tablet computer. The carrier includes a soft form frame that is coupled to, or unitary with, a soft form main strap. The carrier functions to sandwich a portable electronic device between first and second elastic framing components, while the soft form frame envelops all four sides of the portable electronic device. The soft form frame presents minimal overlap to the front and rear faces of the portable electronic device providing the user dual-sided access to the portable electronic device while efficiently and safely retaining the portable electronic device in the soft form frame with minimal weight and bulk.

Figure 1:
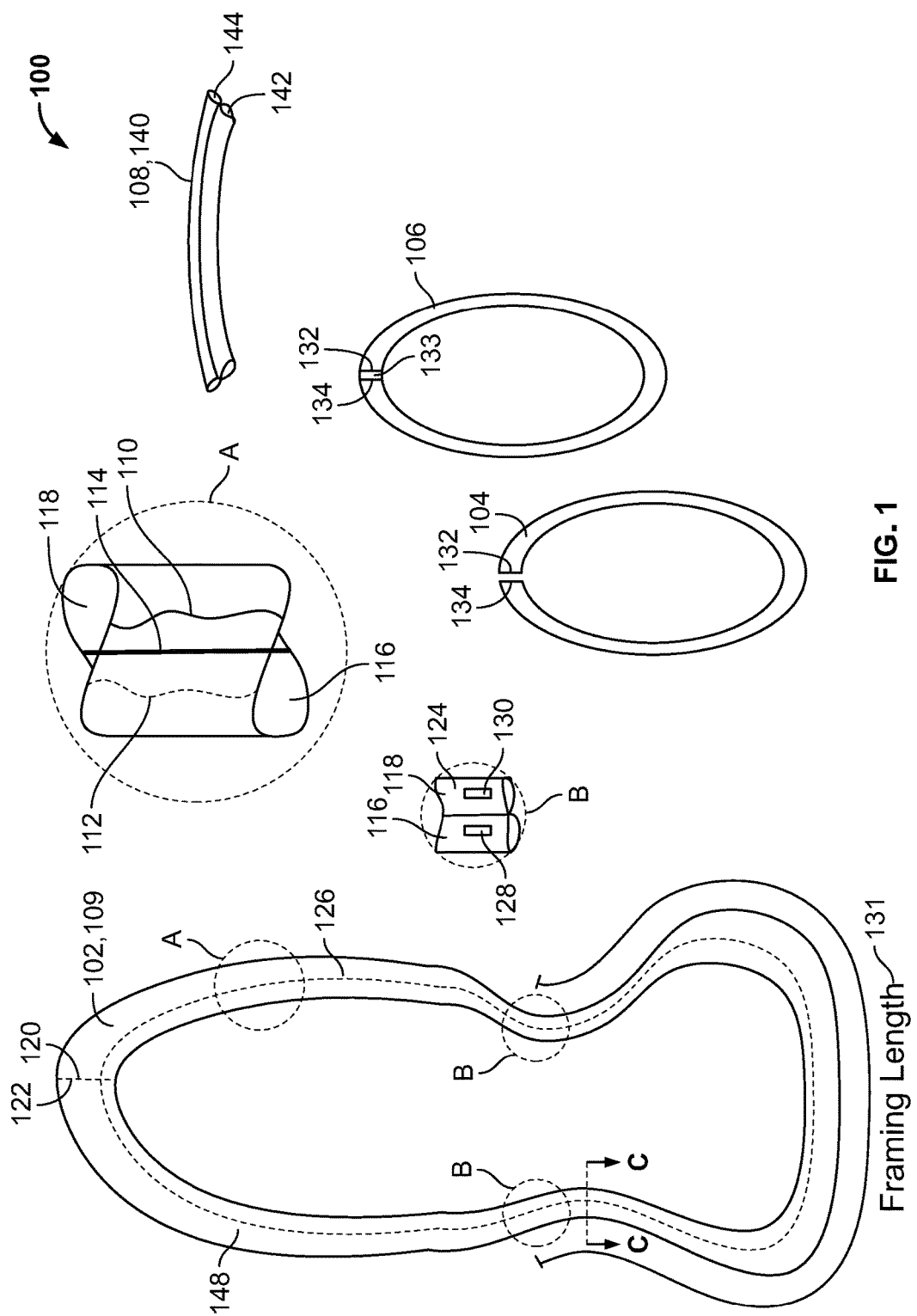
FIG. 1 is an assembly view of example embodiment of the portable electronic device carrier with dual-sided accessibility.

FIG. 1 illustrates an example embodiment of a portable electronic device carrier 100 with dual-sided accessibility. The portable electronic device carrier 100 generally comprises a main strap 102, a first framing component 104, a second framing component 106, and a framing cover 108. Each of the main strap 102 and the framing cover 108 are of a non-rigid material, flexible material such as fabric, leather, flexible plastic, and/or other flexible materials, alone or combination, that provide the portable electronic device carrier 100 with a soft form factor.

The main strap 102 comprises a length of material 109 have a first side edge 110 and a second side edge 112, see inset A of FIG. 1. Each of the side edges 110, 112 can be finished, e.g., hemmed, pinked with pinking shears, etc., or left raw. The first side edge 110 is positioned to overlap the second side edge 112 while a center seam 114 joins the first and second side edges 110, 112 as well as establishes first and second channels 116, 118, see FIG. 2; the center seam 114 can be sewn or can be created via other suitable processes, e.g. gluing, tacking, or any other process capable of joining first and second side edges 110, 112. First and second ends 120, 122 of the material 109 are then joined to establish the main strap 102 as a continuous loop presenting an interior surface 124 and exterior surface 126. A pair of slots (e.g., buttonhole slots) 128, 130 provided on opposing sides of the interior surface 124 provide access to the first and second channels (or tunnels) 116, 118, respectively. The slots 128, 130 are positioned such that a framing portion 131 between corresponding slots, e.g., 128-128, 130-130, can accommodate three sides of a portable electronic device such as sides A, B, and C of the exemplary portable electronic device 10 illustrated in FIGS. 3A-3B.

In certain embodiments, the material 109 used to make the main strap 102 is between 3 and 4 inches wide prior to joining the first and second side edges 110, 112. In certain embodiments, the length of material 109 used to make the main strap 102 prior to joining the first and second ends 120, 122 is greater than six inches, greater than 12 inches, greater than 24 inches, greater than 36 inches, greater than 48 inches, or greater than 60 inches.

Each of the first and second framing components 104, 106 comprises a length of elastic material, e.g. an elastic cord, elastic tape, elastic fabric, etc. In certain embodiments, the first and second framing components 104, 106 each comprise an elastic tape that is approximately one-quarter inch in width, however a larger or smaller width can also be used. In certain embodiments, each of the first and second framing components 104, 106 comprises an elastic tape that is approximately 13 inches in length enabling a one-half inch overlap 133 to join first and second ends 132, 134 of the framing components 104, 106 leaving a continuous loop of 12 inches in length. In certain embodiments, the finished length can vary slightly and can be adjusted to the outer dimensions of the electronic device.

The framing cover 108 is a length of material 140 joined to form two channels 141, 142 similar to the main strap 102. In certain embodiments, the material 140 of the framing cover 108 is of the same material 109 as the main strap 102. In certain embodiment, the material 140 of the framing cover 108 is of a different material than the material 109 of the main strap 102. The actual length of the framing cover 108 is sufficient to span the open distance of the fourth side, e.g., side D of FIGS. 3A-3B, of the portable electronic device 10 when the other three sides, e.g. side A, B, and C, of the portable electronic device 10 are positioned within the main strap 102; the framing cover 108 and the framing portion 131 of the main strap 102 intermediate the corresponding slots 128-128, 130-130 provide a substantially complete frame 143 about the perimeter of the portable electronic device 10, see FIGS. 4A-4B.

Assembly of the portable electronic device carrier 100 includes preparing the main strap 102 to a continuous loop configuration that defines the first and second channels 116, 118 with corresponding pairs of slots 128-128, 130-130 at the interior surface 124 of the main strap 102 as described above. Subsequently, the first framing component 104 is threaded through slot 128 into the first channel 116 and received out the opposing slot 128. Similarly, the second framing component 106 is threaded through the slot 130 into the second channel 118 and received out the opposing slot 130. The first ends 132 of the framing components 104, 106 are threaded through respective channels 142 144 of the framing cover 108. The framing cover 108 can then be pushed towards the interior surface 124 of the main strap 102 enabling the joining (e.g. by sewing, gluing, tacking, clipping, etc.) of the first and second ends 132, 134 of the first and second framing components 104, 106. Upon the joining of the first and second ends 132, 134 of the first and second framing components 104, 106, the first and second framing components 104, 106 define two continuous loops 144, 146, see FIGS. 4A-4B. The framing cover 108 can then be drawn from its pushed aside condition to expand and cover exposed portions of the first and second framing components 104, 106 (e.g., those portions of the first and second continuous loops 144, 146 not covered by the main strap 102).

Once assembled, the device carrier 100 can be manually expanded and the portable electronic device 10 can be inserted within the frame 143, see FIGS. 4A-4B. The portable electronic device 10 can be manually adjusted therein until one can feel, through the main strap 102 portion of the frame 143, the continuous loop 144 placed upon a first face 12 of the portable electronic device 10 and the continuous loop 146 placed upon the second face 14 of the portable electronic device 10. When properly placed the center seam of the framing portion 131 and framing cover 108 are positioned at approximately the midpoint of the side walls of the portable electronic device 10. As such, the portable electronic device 10 is essentially sandwiched between the two continuous loops 144, 146 as the elastic tension provided by the two continuous loops 144, 146 retains the portable electronic device within the frame 143. Further, the main strap 102 portion of the frame 143 and the framing cover 108 envelop the sides A, B, C, D of the portable electronic device 10 (see FIGS. 3A-3B).

Notably, when positioned within the frame 143, only the sides A, B, C, D of the portable electronic device 10 are covered, along with a small rim edge 16 (e.g., from about one-eighth of an inch to one-half of an inch) of the first and second faces 12, 14 of the portable electronic device 10, are covered by the frame 143 leaving the majority of the surface area of both the first and second faces 12, 14 of the portable electronic device 10 available to the user. The portable electronic device 10 can be oriented within the frame 143 such that when the user grabs the portable electronic device 10 within the frame 143, the portable electronic device 10 presents in an immediately usable position (e.g. a control button 18 toward the palm of the hand and a display 20 toward the fingertips of the hand). Other orientations are also possible, as desired.

Figure 5A:
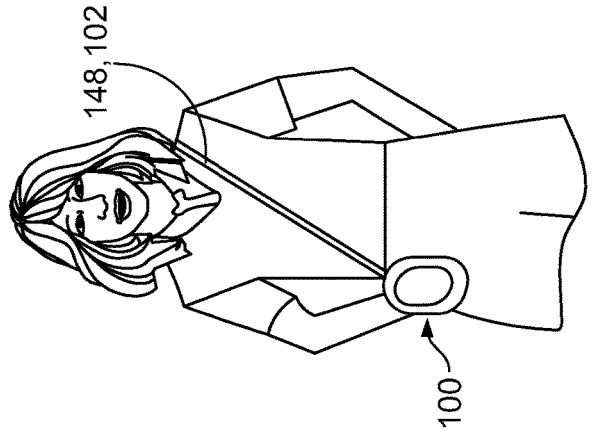
FIGS. 5A-5F illustrate various carrying modes for the various embodiments of the portable electronic device carrier with dual-sided accessibility.
Figure 5B:
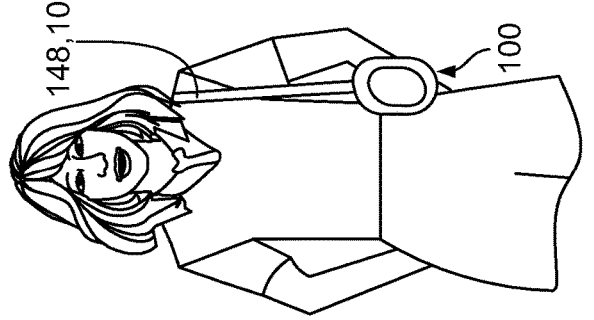
Figure 5C:
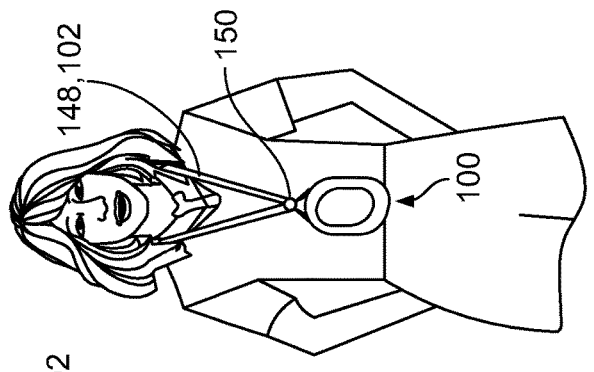
Figure 5D:
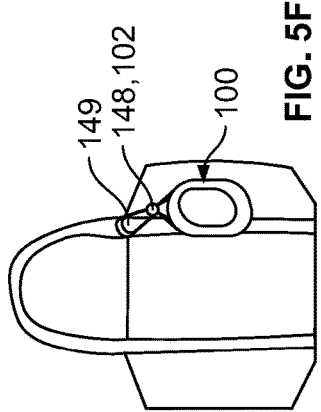
Figure 5E:
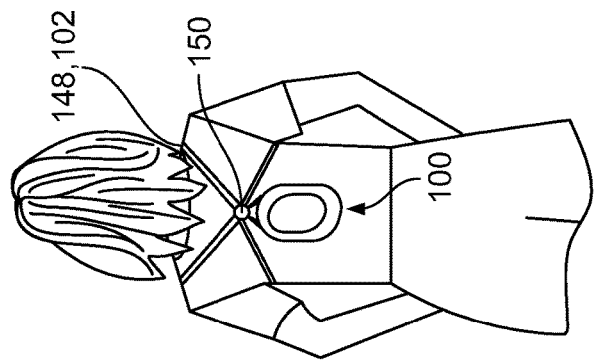
Figure 5F:
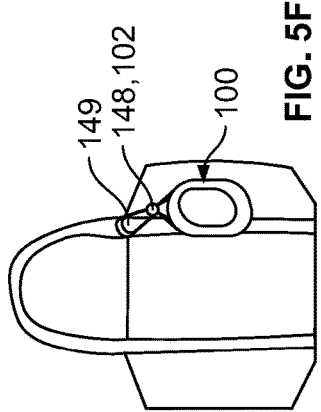

A non-framing portion 148 of the main strap 102 can now be configured and used according to the user's desired carrying mode. For example: (a) the non-framing portion 148 of the main strap 102 can be placed upon the shoulder and across the torso for a cross-body carrying mode, see FIG. 5A; (b) the non-framing portion 148 of the main strap 102 can be draped over the shoulder for a shoulder carrying mode, see FIG. 5B; (c) the non-framing portion 148 of the main strap 102 can be placed around the neck for a lanyard carrying mode, see FIG. 5C; (d) the non-framing portion 148 of the main strap 102 can be placed about the wrist for a wrist carrying mode, see FIG. 5D; (e) the non-framing portion 148 of the main strap 102 can be configured for placement across the shoulders and under the arms in a backpack carrying mode, see FIG. 5E; (f) the non-framing portion 148 of the main strap 102 can be secured to another item such as a bag, a belt, a belt loop via the main strap 102 or a clip 149 attached to the main strap 102 in an item attachment carrying mode, see FIG. 5F.

In certain embodiments the non-framing portion 148 of the main strap 102 is tied into one or more knots 150, see FIGS. 4A-4B, which can be used to adjust the length of the non-framing portion 148 of the main strap; the knots 150 can also serve as a decorative feature. In certain embodiments, the non-framing portion 148 of the main-strap 102 includes an adjustment and/or detachable device 152, e.g. buckle, snaps, buttons, Velcro™, or any other mechanism that enables the adjustment of the length of the non-framing-portion of the main strap 102, see FIGS. 6A-6B.

Another example embodiment of a portable electronic device carrier 600 is illustrated in FIGS. 6A-6B. The embodiment is similar to the carrier 100, however, the present embodiment includes a main strap 601 that has been divided into a framing portion 603 that is separate from a non-framing portion 605. As such, the framing portion 603 is designed to be removably attachable to the non-framing portion 605 via a retractable clasps 607 and interfacing loops 609. The retractable clasps 607 and interfacing loops 609 can be secured to either the framing portion 603 or non-framing portion 605. Other interfacing mechanisms, e.g. snaps, Velcro, buttons, etc., can also be used to removably secure the framing portion 603 to the non-framing portion 605. FIG. 6B also illustrates the soft form, collapsible, minimalistic and light weight nature of the carrier 600 and, particularly, the framing portion 603; notably, when portable electronic device 10 is no longer within the framing portion 603, the tension of the elastic first and second framing components 609, 611 is released allowing the first and second framing components, 609, 611 and the material of the framing portion 603 retract from a taught framing state into a relaxed state.

It will be appreciated that aspects of the above embodiments may be combined in any way to provide numerous additional embodiments. These embodiments will not be described individually for the sake of brevity.

While the present invention has been described above primarily with reference to the accompanying drawings, it will be appreciated that the invention is not limited to the illustrated embodiments; rather, these embodiments are intended to disclose the invention to those skilled in this art. In the drawings, like numbers refer to like elements throughout. Thicknesses and dimensions of some components may be exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, operations, elements, and/or components, but do not preclude the presence or addition of one or more other features, operations, elements, components, and/or groups thereof.

Herein, the terms "attached", "connected", "interconnected", "contacting", "mounted" and the like can mean either direct or indirect attachment or contact between elements, unless stated otherwise.

Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed:

1. A portable electronic device carrier, comprising:
  a main strap having a framing portion and a non-framing portion, wherein the framing portion includes a first channel and a second channel;
  a first and a second elastic framing component, wherein at least a portion of each of the first and the second elastic framing components reside within the first and second channels of the framing portion, respectively; and
  a framing cover having a first channel and a second channel, wherein a remaining portion of each of the first and second elastic framing components reside within the first and second channels of the framing cover, respectively, wherein the combined framing portion, framing cover and first and second elastic framing components define a perimeter-hugging, portable electronic device soft form frame having a central opening there through, wherein a perimeter of a portable electronic device received within the soft form frame is surrounded by the soft form frame and wherein the received portable electronic device is retained within the soft form frame via a tension of the first and second elastic framing components about the perimeter of the portable electronic device.

2. The portable electronic device carrier of claim 1, wherein framing portion and the non-framing portion are of a continuous, unitary configuration.

3. The portable electronic device carrier of claim 1, where framing portion is removably attached to the non-framing portion.

4. The portable electronic device carrier of claim 1, wherein the portable electronic device soft form frame is movable between a framing state and a relaxed state.

5. The portable electronic device carrier of claim 1, wherein the portable electronic device received within the soft form frame is simultaneously provided with unobstructed access to both a front face and a rear face of the portable electronic device via the central opening.

6. The portable electronic device carrier of claim 1, wherein the non-framing portion of the main strap is convertible among a plurality of carrying modes.

7. The portable electronic device carrier of claim 6, wherein the plurality of carrying modes comprise: a crossbody carrying mode, a shoulder carrying mode, a lanyard carrying mode, a wrist carrying mode, a backpack carrying mode and an item attachment carrying mode.

8. The portable electronic device carrier of claim 1, wherein the portable electronic devices comprises a portable phone or a portable tablet computer.

9. The portable electronic device carrier of claim 1, wherein the framing portion of the main strap includes two pairs of slots, the first and second elastic framing components insertable through the slots.

10. The portable electronic device carrier of claim 1, wherein each of the framing portion of the main strap and the framing cover include a center seam that separates the respective first and second channels, and wherein, when the portable electronic device is received within the portable electronic device soft form frame, the center seam is aligned with a midpoint of a side wall of the received portable electronic device.

11. A method for making a portable electronic device carrier, the method comprising:
defining a first channel and a second channel in a first soft form material, the first soft form material having a length sufficient to wrap a perimeter of at least three sides of a four-sided portable electronic device;
defining a first channel and a second channel in a second soft form material, the second soft form material having a length sufficient to wrap the perimeter of the remaining side of the four-sided portable electronic device;
inserting a first elastic component, having a first and second end, through the first channel of the first soft form material and through the first channel of the second soft form material, then joining the first and second ends of the first elastic component to define a first continuous elastic loop that is stretchable to extend about the perimeter of all four sides of the four-sided electronic device; and
inserting a second elastic component, having a first and second end, through the second channel of the first soft form material and through the second channel of the second soft form material, then joining the first and second ends for the second elastic component to define a second continuous elastic loop that is stretchable to extend about the perimeter of all four sides of the four-sided electronic device,
wherein first and second continuous elastic loops within the first and second soft materials define a perimeter-hugging soft form frame that surrounds all four sides of the four-side electronic device, wherein the perimeter-hugging soft form frame has a central opening that provides simultaneous unobstructed access to a front face and a back face of a four-sided electronic device inserted within the soft form frame.

12. The method of claim 11, further comprising removably attaching a carrying strap to the first soft form material.

13. The method of claim 12, further comprising configuring the carrying strap for one of a plurality of carrying modes, the plurality of carrying modes comprising: a crossbody carrying mode, a shoulder carrying mode, a lanyard carrying mode, a wrist carrying mode, a backpack carrying mode and an item attachment carrying mode.

14. The method of claim 11, further comprising defining a carrying strap with the first soft form material by joining a first and a second end of the first soft form material.

15. The method of claim 14, further comprising configuring the carrying strap for one of a plurality of carrying modes, the plurality of carrying modes comprising: a crossbody carrying mode, a shoulder carrying mode, a lanyard carrying mode, a wrist carrying mode, a backpack carrying mode and an item attachment carrying mode.

16. The method of claim 11, further comprising defining at least two pairs of slots in the first and second channels of the first soft form material.

17. The method of claim 16, wherein inserting the first and second elastic components through the first and second channels, respectively, of the first soft form material includes inserting the first and second elastic components through the at least two pairs of slots in the first and second channels of the first soft form material.

18. The method of claim 11, further comprising manually expanding both the first and second soft form materials and the first and second elastic components within the first and second channels of the first and second soft form materials to a portable electronic device framing shape that has a central opening there through and is configured to receive the four-sided portable electronic device.

19. A portable electronic device carrier, comprising:
a main strap having a framing portion and a non-framing portion, wherein the framing portion includes a first channel and a second channel;
a first and a second elastic framing component, wherein at least a portion of each of the first and the second elastic framing components reside within the first and second channels of the framing portion, respectively; and
a framing cover having a first channel and a second channel, wherein a remaining portion of each of the first and second elastic framing components reside within the first and second channels of the framing cover, respectively,
wherein the combined framing portion, framing cover and first and second elastic framing components define a non-continuous, perimeter-hugging portable electronic device soft form frame having continuous first and second elastic framing components, wherein the non-continuous, perimeter-hugging portable electronic device soft form frame has a central opening there through, wherein a perimeter of a portable electronic device received within the non-continuous, perimeter-hugging portable electronic device soft form frame is surrounded by the soft form frame, wherein the received portable electronic device is retained within the soft form frame via a tension of the continuous first and second elastic framing components and wherein the central opening simultaneously provides unobstructed access to both a front face and a rear face of the received portable electronic device.

20. The portable electronic device carrier of claim 19, wherein the non-framing portion of the main strap is convertible among a plurality of carrying modes, the plurality of carrying modes comprising: a cross-body carrying mode, a shoulder carrying mode, a lanyard carrying mode, a wrist carrying mode, a backpack carrying mode and an item attachment carrying mode.

* * * * *